United States Patent [19]

Frye et al.

[11] 4,138,027

[45] Feb. 6, 1979

[54] VACUUM BOTTLE CONSTRUCTION

[75] Inventors: Alva L. Frye, Brentwood; Herbert M. Stewart, Nashville, both of Tenn.

[73] Assignee: Aladdin Industries, Incorporated, Chicago, Ill.

[21] Appl. No.: 852,290

[22] Filed: Nov. 17, 1977

Related U.S. Application Data

[63] Continuation of Ser. No. 669,278, Mar. 22, 1976, abandoned.

[51] Int. Cl.² .............................................. A47J 41/02
[52] U.S. Cl. .................................. 215/13 R; 220/420; 220/455; 220/458
[58] Field of Search ................ 215/12 A, 12 R, 13 R; 220/420, 421, 455, 456, 457, 458

[56] References Cited

U.S. PATENT DOCUMENTS

| 889,992 | 6/1908 | Van Wye | 215/13 R |
| 916,450 | 3/1909 | Keller | 215/13 R |
| 3,295,709 | 1/1967 | Herrick | 215/13 R |
| 3,845,873 | 11/1974 | Bridges | 215/13 R |
| 3,863,794 | 2/1975 | Hata | 215/13 R |
| 3,913,776 | 10/1975 | Tantam | 215/13 R |
| 3,939,834 | 2/1976 | McMahon | 215/13 R |
| 3,961,720 | 6/1976 | Potter | 215/13 R |

Primary Examiner—Ro E. Hart
Attorney, Agent, or Firm—McDougall, Hersh & Scott

[57] ABSTRACT

A vacuum bottle construction is disclosed in which the vacuum filler is formed from a pair of concentric thin wall metal cylinders. The cylinders are formed of a thin metallic material, such as mild steel, which is unable to withstand the pressure differential of atmospheric pressure on one side and a vacuum on the other side. To prevent collapse of the filler a rigid jacket is provided over the outer wall in intimate contact therewith to prevent collapse.

15 Claims, 4 Drawing Figures

VACUUM BOTTLE CONSTRUCTION

This is a continuation of application Ser. No. 669,278, filed Mar. 22, 1976, now abandoned.

BACKGROUND OF THE INVENTION

This invention relates generally to insulated containers. More specifically, it relates to improvements in vacuum insulated containers.

To provide thermal insulation by the use of a substantial vacuum between the spaced side walls of a container is, of course, so well known as to require no extensive discussion. Generally, the prior art on this subject with which the applicants are familiar may be categorized according to the material from which the container is made.

First and most common, are those containers made of glass. Glass, while offering numerous advantages, has some disadvantages. Its greatest disadvantage is that it is subject to breakage both in the manufacturing process and in use. To minimize this problem the art has resorted to a number of devices. These include protection by a jacket of metal or plastic, means to adsorb shock and prevent movement of the glass in the jacket. Very frequently the thermos bottle is provided with a plastic liner to prevent glass from a broken filler from entering into a foodstuff held in the bottle. Another disadvantage of glass is its cost, which is relatively high percentage of the cost of the entire container.

Another commonly used material for vacuum insulated containers is metal, particularly stainless steel. Vacuum or thermos bottles have been made from relatively thick metallic material for some time (see, for example, U.S. Pat. No. 3,331,522 assigned to the present assignee). These bottles, while practically eliminating the breakage problem, are quite costly to manufacture and, therefore, are costly to the consumer.

While glass and metal vacuum bottles are those most widely used in the industry, we are aware that in the literature it has been proposed to use other materials such as ceramics, plastics or various laminated constructions. To our knowledge none of these alternative constructions have ever appeared as commercially acceptable products for each apparently has its own set of problems. Plastics and ceramics may be porous and subject to outgassing, i.e., the release of entrapped gases in the material, thus destroying the vacuum. Laminates are costly and usually involve the use of plastics and natural materials which themselves are unsatisfactory as stated above.

In the light of the foregoing it is believed that significant advantages can be achieved by the provision of a vacuum or thermos bottle which is substantially free of the problems of the prior art.

Therefore, it is an object of this invention to provide a novel vacuum insulated container which is not subject to breakage, but is relatively economical to manufacture.

It is another object of this invention to provide a novel vacuum bottle made out of commonly available materials which are impervious and not subject to any significant outgassing.

It is a still further object of this invention to provide a novel vacuum container which may be fabricated using well known material and manufacturing techniques whereby it may be made relatively economically.

BRIEF STATEMENT OF THE INVENTION

The foregoing and other objects are achieved in one embodiment of the invention by a vacuum insulated container with inner and outer walls or shells formed of metallic material wherein the metallic shells are themselves relatively thin and wherein a jacket encases the outer shell to prevent its inward collapse from the pressure differential.

BRIEF DESCRIPTION OF THE DRAWINGS

The invention itself is set forth with particularity in the claims appended hereto and forming a part of this specification while an understanding of the structure of various embodiments thereof may be had by reference to the detailed description in conjunction with the drawings in which:

DETAILED DESCRIPTION

Figure 2:
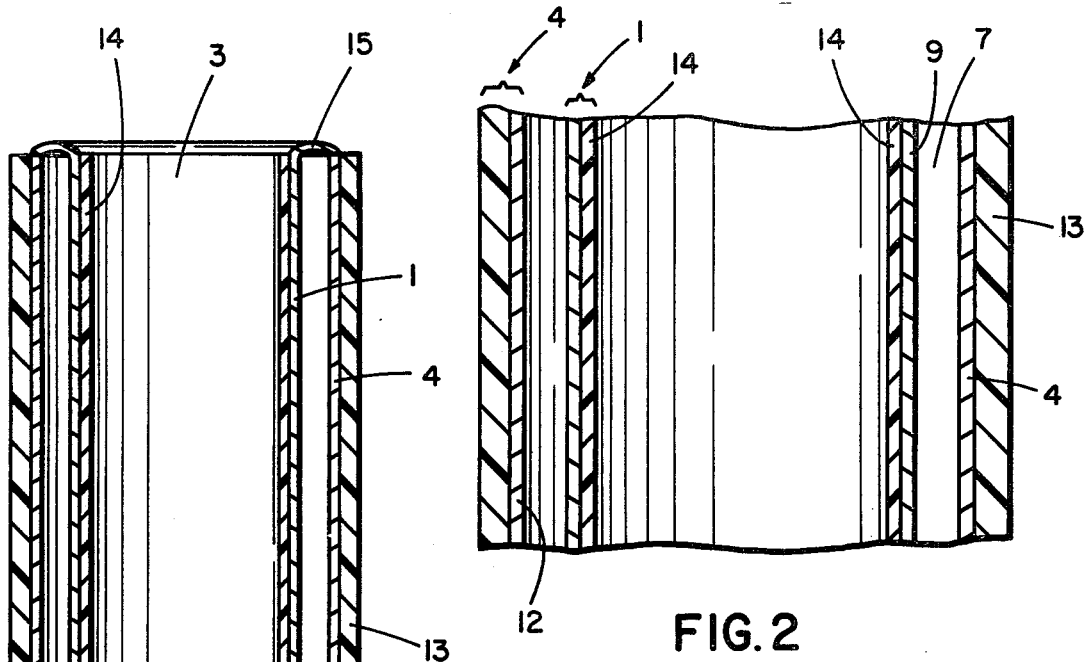
FIG. 2 is an enlarged partial view in cross-section of the embodiment of FIG. 1.
Figure 1:
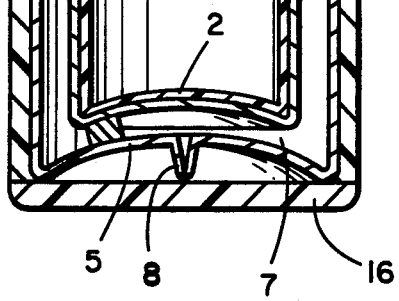
FIG. 1 is a cross-sectional illustration of a first embodiment of the invention.

A first embodiment of the invention, as seen in FIGS. 1 and 2, comprises a container formed in part by an inner wall or shell 1 formed typically as a generally cylindrical container with an open top 3. The bottom 2 may be flat or as shown, curved slightly upward. Joined to the inner shell 1 is outer wall or shell 4 with a bottom 5 curved slightly upward as is the bottom of inner shell 1.

The inner and outer shells 1 and 4 are joined at their tops around the opening 3 as indicated by reference numeral 6 to provide an enclosed space 7. In order to evacuate or create a substantial vacuum in the space 7, a tube 8 is provided in the bottom 5 for connection to a suitable exhaust means. After the space 7 has been evacuated to the desired degree the tube 8 is sealed by pressure and/or heat to maintain the vacuum therein.

A principal aspect of the invention resides in forming the inner and outer shells of a relatively thin metallic material. By relatively thin it is meant thin to a point that the outer shell 4 would collapse inwardly under atmospheric pressure when the space 7 has been evacuated if no other structure were present. Thus, if the space 7 is evacuated so that the residual gas pressure is approximately 10 microns or less of mercury, a desired value, the net external pressure on the outer shell 4 will be approximately 760 mm Hg (1 atmosphere) and the shell will collapse inwardly.

In one embodiment it is proposed to use as a material for the inner and outer shells 1 and 4 mild steel with or without a tin coating of the type and thickness used for packaging beverages such as beer or soft drinks. Alternatively, the shells may be formed from aluminum. Such containers, as is well known, are produced in large quantities and are usually from 4 mils to 12 mils thick. By reference to FIG. 2 it may be seen, therefore, that the inner shell 1 is constituted by a layer of mild steel or aluminum. If the shells are produced by the "drawn and ironed" technique, a lubricant layer of another material may be present. For example, with mild steel a lubricating layer of tin is present. The outer shell is similarly formed.

The invention is completed by providing a protective jacket or casing 13 which may be formed of any suitable material and which encases the outer wall 4 and is positioned against it. Preferred materials for the jacket are plastic, metal and glass. The casing 13 may be formed and positioned in a number of different ways as, for instance, by molding a plastic jacket in place, filament winding of a glass jacket, or by molding it as a separate piece and then inserting the shells into it. When assembled the protective jacket 13 functions to prevent the atmospheric pressure from collapsing the outer wall 4.

The protective jacket 13 can be bonded to the outer shell 4 or it may merely be in intimate surface contact with it in an unbonded condition. When the jacket is bonded to the outer shell, the mechanism for preventing collapse is different from the mechanism when the jacket merely contacts the outer shell. Adhering the shell to the jacket prevents its collapse since the jacket possesses sufficient mechanical strength to resist the pressure differential between the atmospheric pressure outside the container and the vacuum condition between the shells.

In the case of the unbonded construction, the protective jacket is intimate surface contact but not secured to the outer shell. This technique prevents atmospheric pressure from acting on the outer shell. That is, since the jacket will not flex under a pressure differential and since it is in intimate surface contact with the outer shell, the atmospheric pressure cannot act on the outer shell to cause collapse. In the unbonded case the jacket must be sufficiently impermiable so pressure does not build up against the outer shell.

The jacket need not contact the shell over its entire surface area although is is preferable. The jacket need only surround the outer shell and be in intimate contact therewith over those portions of the outer shell which are weakest. i.e., most subject to collapse from the pressure differential. Generally this will be the shell area midway between the ends.

The protective jacket, in order to perform its function properly, must be of sufficient strength and thickness so that it will not itself flux due to the pressure differential. Thus, it will insulate the outer shell from atmospheric pressure and prevent collapse.

No jacket, liner or other device is necessary to prevent deformation of the inner shell 1. This is because the pressure differential, which is evenly applied around the circumference of the inner shell, exerts a stretching (rather than collapsing) force on the shell which is resisted by the strength of the material.

If it is desirable or necessary to provide for resistance to rust, corrosion or the effect of acids in foods on the interior surface of the inner shell 1, a protective coating of suitable inert materials, such as glass, plastics, inorganic coatings, may be provided as a liner 14 on the interior of the container. The liner, of course, may have portions 15 overlapping the tops of the inner and outer shells to completely isolate those shells from any contact with the contents of the container. Likewise, the bottom of the container may be closed off by a suitable bottom closure 16, if desired.

Figure 3:
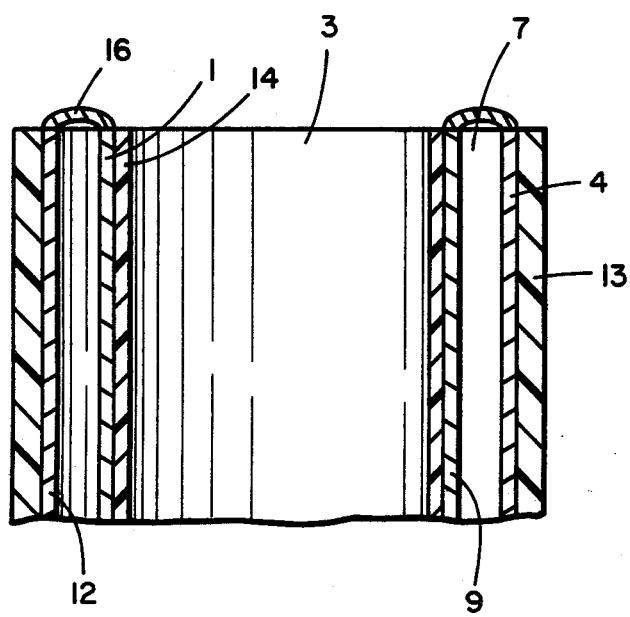
FIG. 3 is a partial view in cross-section of another embodiment of the invention.

The ability of the container to thermally insulate its contents can be enhanced by the use of the embodiments of FIG. 3.

It has been proposed in connection with the embodiments of FIGs. 1 and 2 to use mild steel or aluminum as the thin walled inner and outer shells. Because the thermal conductivity of mild steel and aluminum is relatively high compared to many other materials, and since there is a direct connection between the inner and outer shells, a further improvement becomes possible with the embodiment of FIG. 3. The improvement reduces conductive loss from the inner shell to the outer shell.

In the embodiment of FIG. 3 the tops of the inner and outer shells 1 and 4, instead of being joined by welding, are joined and sealed together through an intermediate member 16 which may be formed of a material having a lower coefficient of thermal conductivity than mild steel or aluminum. The intermediate member is suitably formed of stainless steel, glass frit, ceramic or other suitable nonporous material 17 which can be bonded to the shells. The member is joined to the shells 1 and 4 by welding or any suitable means to obtain airtight joints.

If desired, the ability of container to maintain a vacuum and retain a desired temperature can be further enhanced by the use of well known devices in the vacuum bottle art. For instance, a suitable gettering material can be provided as shown at 18. Also, to reduce heat loss due to radiation from the shell 1 to the shell 4, their interior surfaces can be silvered by techniques known in the art.

Figure 4:
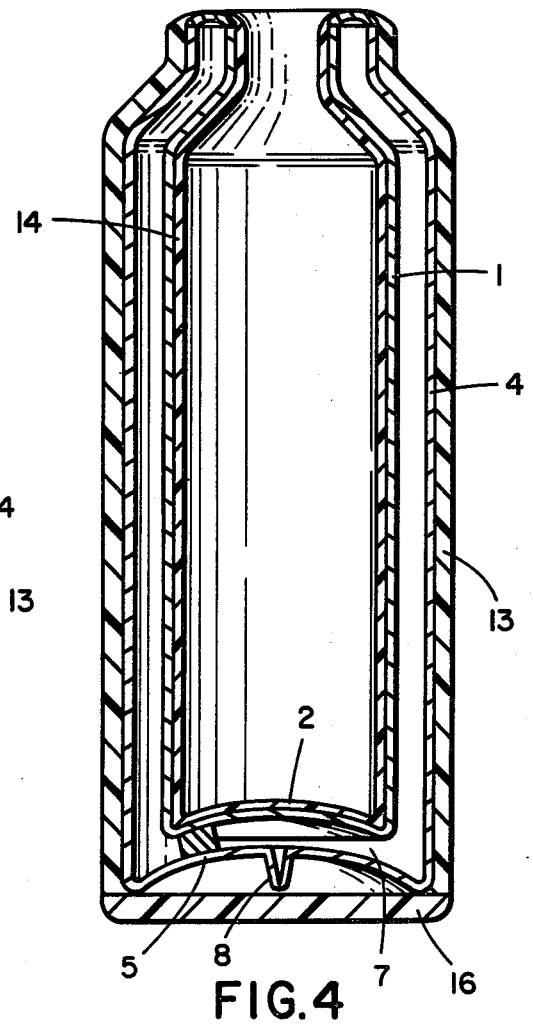
FIG. 4 is a cross-sectional view of still another embodiment of the invention.

The shape, size, selection of bonding and other aspects of the container and its manufacture can be selected by designers, depending upon the use to which a product is to be put. For example, the container of FIG. 4 is in most respects the same as the FIG. 1 embodiment. However, the shells form a narrow opening interior for receiving and pouring liquids, etc., rather than the wide opening configuration of FIG. 1.

Obviously various other changes may be made in the design of various embodiments of the invention, and it is intended by the claims herein to cover all such changes as come within their scope.

What is claimed as new and desired to be secured by letters patent is:

1. A vacuum insulated container comprising:
    (a) a first metallic cylinder open at the top thereof;
    (b) a second metallic cylinder open at the top thereof and of a larger diameter than said first cylinder, said first cylinder positioned inside and uniformly spaced from said second cylinder to define an annular space therebetween;
    (c) means for securing the tops of said cylinders, one to the other, to seal said annular space, said annular space being substantially evacuated;
    (d) said cylinders having a thickness such that said first cylinder can withstand the pressure differential between atmospheric pressure and the reduced pressure of said evacuated annuar space without substantial deformation, said second cylinder requiring mechanical support to withstand said pressure differential;
    (e) a jacket encasing said second cylinder in intimate contact therewith formed of a rigid material, said jacket providing the mechanical support to said second cylinder to prevent deformation thereof.

2. The insulated container of claim 1 wherein the thickness of both cylinders is the same.

3. The insulated container to claim 2 wherein said cylinders have a thickness in the range of four mils to twelve mils.

4. The insulated container according to claim 1 wherein said jacket is in intimate contact with said second cylinder over its entire length.

5. The insulted container according to claim 4 wherein said jacket is hermetically sealed at its ends.

6. The insulated container according to claim 5 wherein said cylinders have a thickness in the range of four mils to twelve mils.

7. The insulated container according to claim 1 wherein said cylinders are formed from one of the groups comprising: mild steel and aluminum.

8. The insulated container according to claim 1 wherein said sealing means includes a connecting element formed of a material having a low thermal conductivity coefficient relative to the coefficient of said cylinders to reduce conduction loss.

9. The insulted container according to claim 8 wherein said connecting element material is selected from the group comprising: ceramic, glass, and stainless steel.

10. The insulated container according to claim 1 wherein said second cylinder includes means for evacuating the air from said annular space.

11. The insulated container according to claim 1 wherein said jacket is formed from the group comprising: plastic, metal, and glass.

12. The insulated container according to claim 1 wherein said jacket is bonded to said second cylinder whereby the jacket prevents collapse of the outer shell by mechanical restraint of the shell against the pressure differential.

13. The insulated container according to claim 1 wherein said cylinders taper inwardly at the top to form a narrow opening into the container interior.

14. The insulated container according to claim 1 wherein a liner is disposed on the interior surface of said first cylinder.

15. The insulated container according to claim 14 wherein said liner is formed frmom a chemically inert material selected from the group comprising: glass, plastic, inorganic coatings.

* * * * *